(12) United States Patent
Lin et al.

(10) Patent No.: US 8,149,089 B2
(45) Date of Patent: Apr. 3, 2012

(54) METHOD FOR UNLOCKING A LOCKED COMPUTING DEVICE AND COMPUTING DEVICE THEREOF

(75) Inventors: Jian-Liang Lin, Taoyuan County (TW); John C. Wang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 656 days.

(21) Appl. No.: 12/275,221

(22) Filed: Nov. 21, 2008

(65) Prior Publication Data

US 2009/0160609 A1 Jun. 25, 2009

(30) Foreign Application Priority Data

Dec. 25, 2007 (TW) .............................. 96149914 A

(51) Int. Cl.
*G05B 19/00* (2006.01)
(52) U.S. Cl. ...................................... 340/5.83; 340/5.8
(58) Field of Classification Search .................. 340/5.2, 340/5.3, 5.83, 5.8
See application file for complete search history.

(56) References Cited

U.S. PATENT DOCUMENTS

| | | | | |
|---|---|---|---|---|
| 6,141,436 A * | 10/2000 | Srey et al. | ...................... | 382/124 |
| 6,819,219 B1 * | 11/2004 | Bolle et al. | ................... | 340/5.52 |
| 6,850,147 B2 * | 2/2005 | Prokoski et al. | ............. | 340/5.53 |
| 7,130,453 B2 * | 10/2006 | Kondo et al. | .................. | 382/117 |
| 7,130,454 B1 * | 10/2006 | Berube et al. | ................... | 382/118 |
| 7,314,167 B1 * | 1/2008 | Kiliccote | ...................... | 235/380 |
| 7,512,254 B2 * | 3/2009 | Vollkommer et al. | ......... | 382/115 |
| 7,702,314 B2 * | 4/2010 | Kang | ........................... | 455/411 |
| 7,925,887 B2 * | 4/2011 | Burton | ........................... | 713/186 |
| 7,929,946 B2 * | 4/2011 | Rathus et al. | .................. | 455/411 |
| 2002/0145507 A1 * | 10/2002 | Foster | ........................... | 340/5.53 |
| 2003/0095689 A1 * | 5/2003 | Vollkommer et al. | ......... | 382/117 |
| 2003/0115490 A1 * | 6/2003 | Russo et al. | ................... | 713/202 |
| 2004/0039909 A1 * | 2/2004 | Cheng | ........................... | 713/169 |
| 2006/0104483 A1 * | 5/2006 | Harel et al. | ..................... | 382/115 |
| 2009/0158423 A1 * | 6/2009 | Orlassino et al. | ............... | 726/19 |
| 2009/0175506 A1 * | 7/2009 | Polcha et al. | .................. | 382/116 |
| 2009/0258667 A1 * | 10/2009 | Suzuki et al. | .............. | 455/550.1 |

FOREIGN PATENT DOCUMENTS

| | | |
|---|---|---|
| CN | 1588426 A | 3/2005 |
| TW | 200509650 | 3/2005 |
| TW | M305517 | 1/2007 |

OTHER PUBLICATIONS

Office action mailed on Jun. 27, 2011 for the Taiwan application No. 096149914, filed Dec. 25, 2007, p. 1-9.

* cited by examiner

*Primary Examiner* — Daniel Wu
*Assistant Examiner* — Rufus Point
(74) *Attorney, Agent, or Firm* — Winston Hsu; Scott Margo

(57) ABSTRACT

A method for unlocking a locked computing device includes obtaining biometric information utilizing the computing device, determining whether the biometric information meets a predetermined requirement, unlocking the computing device when the biometric information obtained meets the predetermined requirement, and maintaining a locked status of the computing device when the biometric information does not meet the predetermined requirement. A computing device includes a sensor utilized for obtaining biometric information, wherein the computing device is for determining whether the biometric information meets a predetermined requirement, for unlocking the computing device when the biometric information obtained meets the predetermined requirement, and for maintaining a locked status of the computing device when the biometric information does not meet the predetermined requirement.

16 Claims, 2 Drawing Sheets

METHOD FOR UNLOCKING A LOCKED COMPUTING DEVICE AND COMPUTING DEVICE THEREOF

BACKGROUND OF THE INVENTION

1. Field of the Invention

The present invention relates to a method for unlocking a locked computing device and, more specifically, to a method that utilizes biological recognition technology to unlock a locked computing device.

2. Description of the Prior Art

As the use of computing devices permeate our daily lives, especially with the recent popularity of mobile computing devices, protecting and securing the use of and the data stored on those devices is becoming increasingly important.

Many computing devices have implemented lock mechanisms to prevent the unauthorized use and/or accidental key inputs. These lock mechanisms typically require the user to type in a password and/or manipulate icons on screen menus each time they want to unlock the devices. Simply (but not only) due to the frequency of use for these devices, many users find these steps to be unnecessarily repetitive and time consuming, and as a result, many users often choose not to lock their devices. This results in much higher probabilities of the device registering erroneous inputs and of the device being left susceptible to unauthorized use and/or malicious security violations.

Thus, there is a need for a method that provides users with an easier and more convenient way of unlocking their computing devices.

SUMMARY OF THE INVENTION

It is therefore an objective of the present invention to solve the aforementioned problems, and to provide a method for unlocking a locked computing device without requiring the user to manipulate a plurality of icons or keypresses each time and a computing device thereof.

It is another objective of the present invention to provide a method and related computing device for unlocking locked computing devices without requiring the authorized user to key in a password each time.

A method for unlocking a locked computing device comprises obtaining biometric information utilizing the computing device, determining whether the biometric information meets a predetermined requirement, and unlocking the computing device when the biometric information obtained meets the predetermined requirement.

A computing device comprises a sensor utilized for obtaining biometric information, wherein the computing device is for determining whether the biometric information meets a predetermined requirement, and for unlocking the computing device when the biometric information obtained meets the predetermined requirement.

The foregoing has outlined rather broadly the features and technical advantages of the present invention in order that the detailed description of the invention that follows may be better understood. Additional features and descriptions of the present invention will be described hereinafter which form the subject of the claims of the present invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

In the disclosed invention, a method for unlocking a locked computing device utilizes obtained biological information to determine whether to unlock the locked computing device. When a predetermined requirement is met, the method automatically unlocks the device, thus circumventing the need for the user to unlock the device manually.

Figure 1:
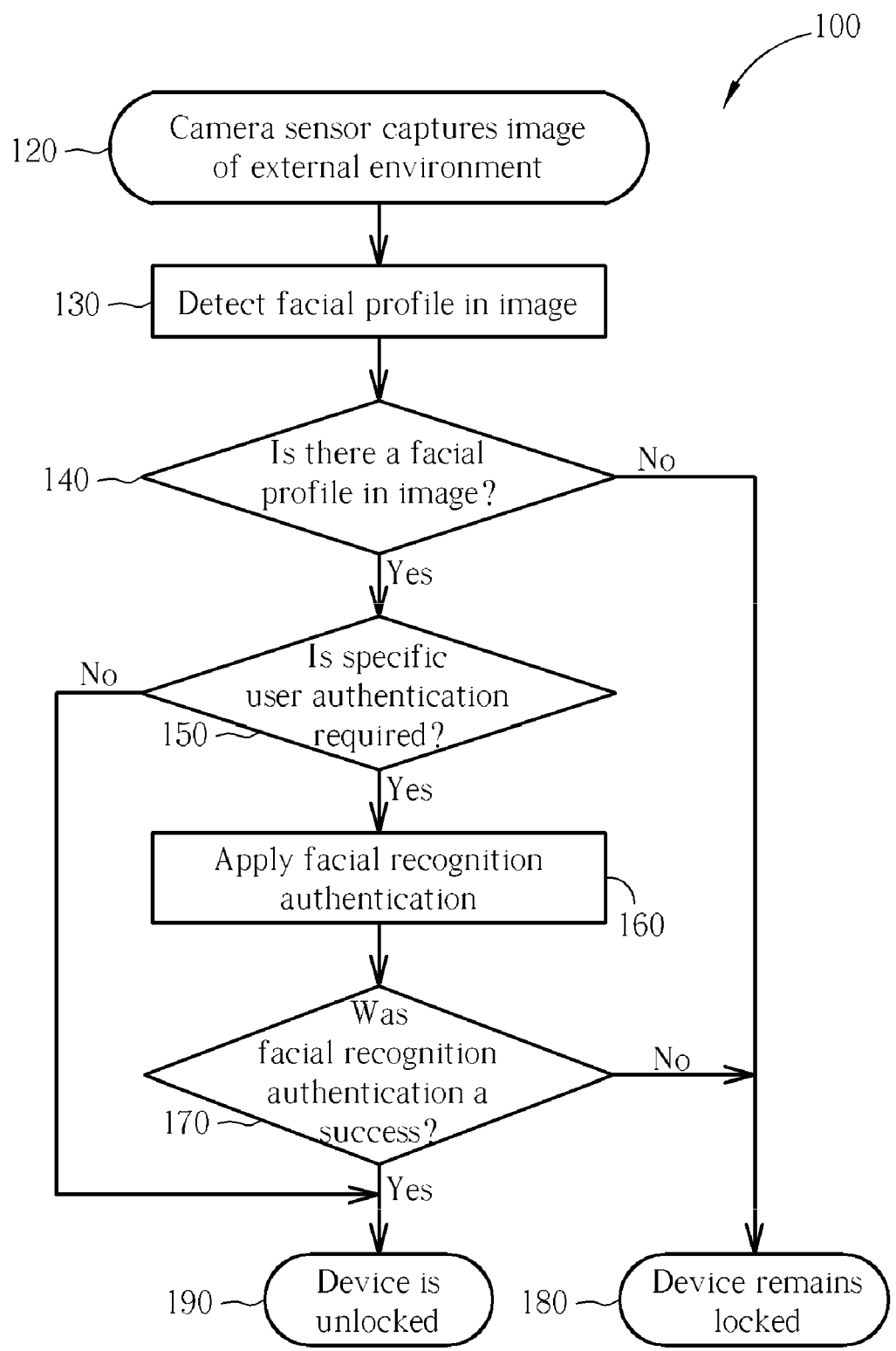
FIG. 1 shows a flowchart of a method for unlocking a locked computing device according to an embodiment of the present invention.

Please refer to FIG. 1, which shows a flowchart for unlocking a locked computing device according to an embodiment of the present invention. Provided that substantially the same result is achieved, the steps of the process flowchart need not be in the exact order shown and need not be contiguous; that is, other steps can be intermediate. The embodiment of the method according to the present invention includes the following steps:

Step 110: User touches locked device.

Step 120: Camera sensor captures image of external environment.

Step 130: Detect facial profile in image.

Step 140: Is there a facial profile in image? If yes, go to Step 150; if no, proceed to Step 180.

Step 150: Is specific user authentication required? If yes, go to Step 160; if no, proceed to Step 190.

Step 160: Apply facial recognition authentication.

Step 170: Was facial recognition authentication a success? If yes, go to Step 190; if no, go to Step 180.

Step 180: Device remains locked.

Step 190: Device is unlocked.

Figure 2:
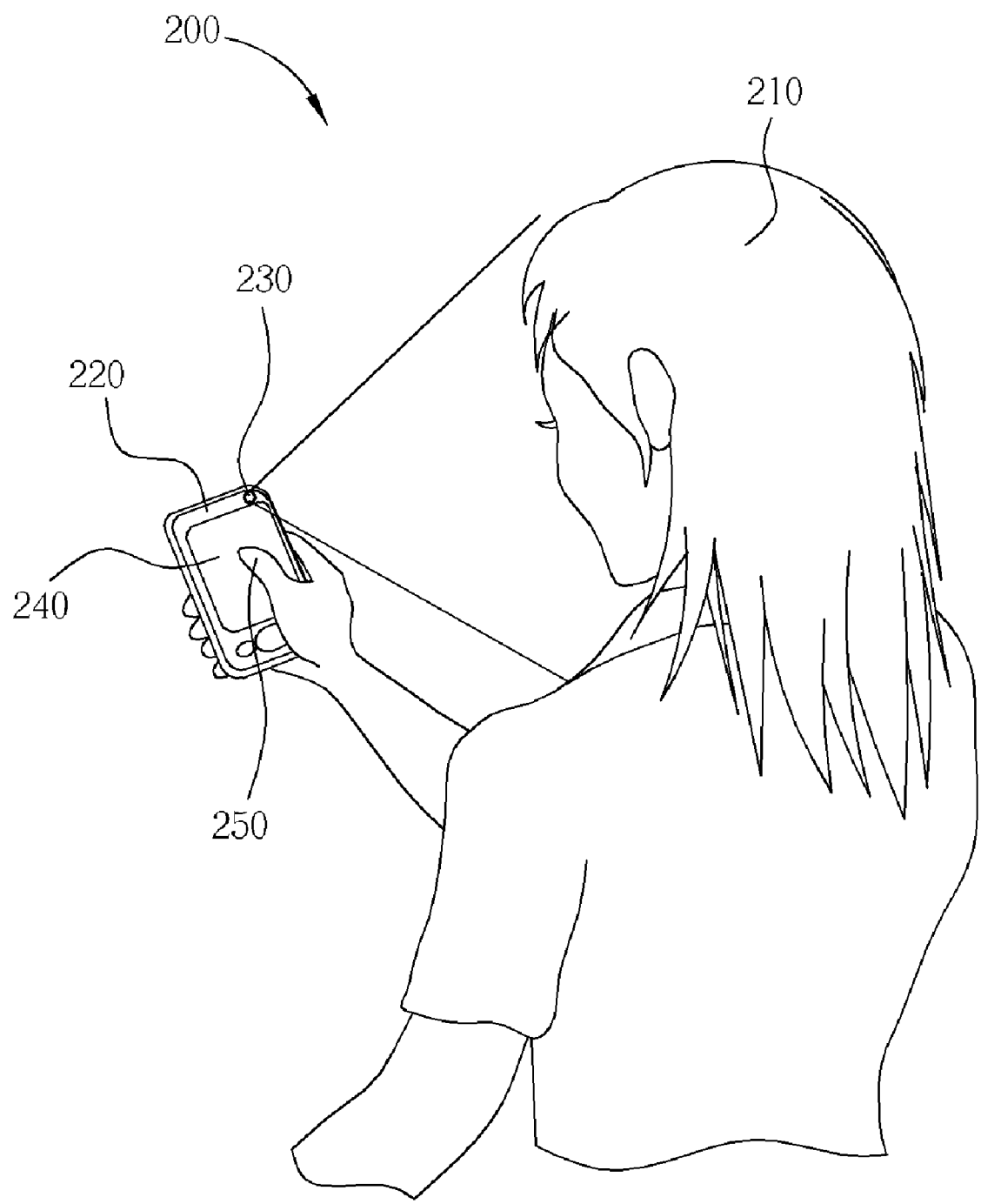
FIG. 2 shows a locked computing device in a user scenario according to an embodiment of the present invention.

FIG. 2 shows a locked computing device in an exemplary user scenario according to an embodiment of the present invention. The exemplary flow shown in FIG. 2 and any alternative design(s) thereof are performed upon the computing device 220. In the user scenario 200, the user 210 is holding the computing device 220. The computing device 220 comprises a camera sensor 230 for obtaining biometric information, and a display 240 for providing feedback to the user 210. In this exemplary embodiment, the computing device 220 is a mobile phone, such as a Smartphone, a PDA phone, or a Touch phone. However, this is for illustrative purposes only, and is not meant to be taken as a limitation of the present invention.

Please refer to both FIG. 1 and FIG. 2 together. From FIG. 1, Step 110 begins as the user 210 touches the locked computing device 220 or manipulates it in a manner by which the computing device 220 interprets as a possible request to unlock. One example of such a manipulation could be via a motion sensor or accelerometer or other similar means. The locked computing device 220 then obtains biometric information, Step 120, by using a camera sensor 230 to capture an image of the external environment in this scenario 200. Then the computing device 220 determines in Step 130 whether the biometric information meets a predetermined requirement; in this scenario 200, the biometric information obtained is a facial profile of user 210, and the predetermined requirement is whether the obtained image comprises a facial profile of a human face (such as that of user 210). When the obtained biometric information (facial profile) does not meet the requirement, the computing device 220 proceeds to Step 180 and remains locked; when the predetermined requirement is met, then the process continues to Step 150.

From Step 150, the computing device 220 determines whether specific user authentication is required; this is a user selectable setting in one embodiment of the present invention and would be predetermined by the user 210 (for example, during configuration of the computing device). When it is not required, Step 190 is executed, and the computing device 220 is unlocked. In the facial profile example, this embodiment requires only that a human facial profile exists in the obtained biometric information, so if the locked computing device 220 is accidentally activated in Step 110 (say, while still in a pocket or purse), the image captured by the camera sensor 230 will not contain a facial profile, and will remain locked in Step 180. Please note that a practical application of this embodiment is to simply prevent accidental keypresses or operation of the computing device 220, which can result in additional power savings.

In a second embodiment, the specific user authentication of Step 150 is required. Given the further requirement in Step 150, the locked computing device 220 applies facial recognition authentication in Step 160. In the example presented, the user 210 has predetermined that not only should there be a facial profile in the image obtained by camera sensor 230, but that it should also match a predetermined facial profile of an authorized user of the computing device 220. In other words, it should not be just anyone's face, but the face of a user who is authorized to use the computing device 220. This can be considered akin to a secret password or other personal security information (such as a fingerprint). Moving forward, in Step 170, the result of the facial recognition authentication of Step 160 is evaluated. When the facial recognition operation successfully matches a predetermined facial profile of an authorized user 210 of the computing device 220, the computing device is then unlocked in Step 190. When the facial recognition operation does not successfully find a match, then Step 180 is executed, leaving the computing device 220 in a locked state. One exemplary application of this second embodiment is in preventing unauthorized use of the computing device 220, for example, in case the computing device 220 is misplaced or stolen.

The flow shown in FIG. 1 merely serves as one exemplary embodiment of the present invention. Other alternative designs without departing from the spirit of the present invention is feasible. For example, in an alternative design, when the specific user authentication is enabled, and the facial recognition operation does not successfully find a match (i.e., the obtained facial profile does not match a predetermined facial profile of any existing authorized user of the computing device 220), the facial profile obtained in Step 140 is added as a new authorized facial profile of the computing device 220 and then the computing device 220 is unlocked if the user enters a specific password; otherwise, the flow proceeds with Step 180, leaving the computing device 220 in a locked state. This also falls within the scope of the present invention.

Please note that there can exist a plurality of predetermined facial profiles of a plurality of authorized users for the computing device 220. In other words, more than one user can be set as an authorized user of the computing device 220; this also falls within the scope of the present invention. Furthermore, one variation on the above method that obeys the spirit of the present invention allows any of the plurality of predetermined facial profiles for any of the plurality of authorized users to return a successful match, and subsequently will unlock the computing device 220.

After reviewing this embodiment of the present invention, other applications and implementations will be obvious to those skilled in the art, and should be included within the scope of the present invention.

For example, in another embodiment of the present invention, the locked computing device 220 includes a fingerprint reader (touch screen 240) utilized for capturing a fingerprint image of a finger 250 of the user 210 to thereby obtain the biometric information. If specific user authorization is (step 150) is not enabled, the computing device 220 unlocks upon recognition of the fingerprint image. On the other hand, if further security is required, the locked computing device 220 can also check to see if the fingerprint image matches a predetermined fingerprint image of an authorized user of the computing device and only unlock upon the fingerprint image matching that of the authorized user.

From the above disclosure, the present invention provides a method and related system for unlocking locked computing devices without requiring the user to manipulate a plurality of icons or keypresses each time, and without requiring the authorized user to key in a password each time, by utilizing biometric information of the user (such as a facial profile or facial recognition).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Those skilled in the art will readily observe that numerous modifications and alterations of the device and method may be made while retaining the teachings of the invention.

What is claimed is:

1. A method for unlocking a locked computing device, the method comprising:
   obtaining biometric information utilizing the computing device;
   determining whether the biometric information meets a predetermined requirement;
   unlocking the computing device when the biometric information obtained meets the predetermined requirement;
   capturing an image of an external environment with a camera in the computing device to thereby obtain the biometric information;
   allowing a user of the computing device to enable specific user authorization;
   when the specific user authorization is enabled, detecting whether a facial profile exists in the image and matches a predetermined facial profile of an authorized user of the computing device to thereby determine whether the biometric information meets the predetermined requirement; and
   when the specific user authorization is not enabled, detecting whether a facial profile exists in the image and is of a human face to thereby determine whether the biometric information meets the predetermined requirement.

2. The method of claim 1, further comprising:
   maintaining a locked status of the computing device when the biometric information does not meet the predetermined requirement.

3. The method of claim 1, wherein the predetermined requirement comprises a facial profile existing in the image and being of a human face.

4. The method of claim 3, wherein the predetermined requirement further comprises the facial profile matching a predetermined facial profile of an authorized user of the computing device.

5. The method of claim 1, further comprising:
   when the specific user authorization is enabled, and the facial profile does not match the predetermined facial profile of the authorized user of the computing device, adding the facial profile as a new authorized facial profile of the computing device and then unlocking the computing device if the user enters a specific password.

6. The method of claim 1, wherein the computing device is a mobile phone.

7. The method of claim 1, further comprising capturing a fingerprint image of a finger of the user utilizing a fingerprint reader to thereby obtain the biometric information.

8. The method of claim 7, wherein the predetermined requirement comprises the fingerprint image matching a predetermined fingerprint image of an authorized user of the computing device.

9. A computing device, comprising:
   a sensor utilized for obtaining biometric information;
   wherein the computing device is for determining whether the biometric information meets a predetermined requirement, and for unlocking the computing device when the biometric information obtained meets the predetermined requirement;
   the sensor is a camera sensor utilized for capturing an image of an external environment to thereby obtain the biometric information
   the computing device allows a user of the computing device to enable specific user authorization;
   when the specific user authorization is enabled, the computing device is for detecting whether a facial profile exists in the image and matches a predetermined facial profile of an authorized user of the computing device to thereby determine whether the biometric information meets the predetermined requirement; and
   when the specific user authorization is not enabled, the computing device is for detecting whether a facial profile exists in the image and is of a human face to thereby determine whether the biometric information meets the predetermined requirement.

10. The computing device of claim 9, wherein the computing device is further for maintaining a locked status of the computing device when the biometric information does not meet the predetermined requirement.

11. The computing device of claim 9, wherein the predetermined requirement comprises a facial profile existing in the image and being of a human face.

12. The computing device of claim 11, wherein the predetermined requirement further comprises the facial profile matching a predetermined facial profile of an authorized user of the computing device.

13. The computing device of claim 9, wherein when the specific user authorization is enabled, and the facial profile does not match the predetermined facial profile of the authorized user of the computing device, the computing device adds the facial profile as a new authorized facial profile of the computing device and then unlocks the computing device if the user enters a specific password.

14. The computing device of claim 9, wherein the computing device is a mobile phone.

15. The computing device of claim 9, wherein the sensor is a fingerprint reader utilized for capturing a fingerprint image of a finger of the user to thereby obtain the biometric information.

16. The computing device of claim 15, wherein the predetermined requirement comprises the fingerprint image matching a predetermined fingerprint image of an authorized user of the computing device.

* * * * *